United States Patent [19]

Chu et al.

[11] Patent Number: 4,540,676

[45] Date of Patent: Sep. 10, 1985

[54] LOW TEMPERATURE FIRED DIELECTRIC CERAMIC COMPOSITION WITH FLAT TC CHARACTERISTIC AND METHOD OF MAKING

[75] Inventors: Mike S. H. Chu; Charles E. Hodgkins, both of Lewiston; Daniel C. Rose, Ransomville, all of N.Y.

[73] Assignee: TAM Ceramics, Niagara Falls, N.Y.

[21] Appl. No.: 613,250

[22] Filed: May 23, 1984

[51] Int. Cl.$^3$ .............................................. C04B 35/46
[52] U.S. Cl. .................................... 501/138; 501/139; 361/321
[58] Field of Search ................................. 501/138, 139

[56] References Cited

U.S. PATENT DOCUMENTS 4,379,854  4/1983  Soong ................................... 501/139
4,459,364  7/1984  McSweeney et al. ............... 501/139

FOREIGN PATENT DOCUMENTS 0021600  2/1979  Japan .................................... 501/138

*Primary Examiner*—Howard S. Williams
*Attorney, Agent, or Firm*—Kenyon & Kenyon

[57] ABSTRACT

A low temperature fired ceramic dielectric composition in which the dielectric constant does not vary from its base value of over 2400 by more than 15 percent over a wide temperature range. A base ceramic preparation (a) and a ceramic flux (b), each consisting essentially of metal oxides or precursors thereof to provide in oxide form (a) 98.0 to 99 weight percent barium titanate, from about 0.97 to about 1.54 weight percent niobium pentoxide and from about 0.19 to about 0.32 weight percent cobalt oxide; (b) from about 16 to about 60 weight percent bismuth titanate, about 8 to about 52 weight percent lead titanate, about 18 to about 35 weight percent zinc oxide and about 5 to about 11 weight percent boron oxide. Manganese dioxide or precursor thereof in amount of from about 0 to 0.114 percent of the combined weight of the base ceramic preparation and ceramic flux is added to the metal oxides or precursors of the base ceramic preparation and ceramic flux and the mixture is fired at a temperature less than about 1150° C.

15 Claims, No Drawings

LOW TEMPERATURE FIRED DIELECTRIC CERAMIC COMPOSITION WITH FLAT TC CHARACTERISTIC AND METHOD OF MAKING

BACKGROUND OF THE INVENTION

The present invention relates to a low temperature fired dielectric ceramic composition in which the dielectric constant does not alter from its base value by more than 15 percent over a wide temperature range. More specifically, this invention relates to a dielectric ceramic composition with a dielectric constant of over about 2400 which is formed by firing a base ceramic preparation comprising a mixture of dielectric oxides and a ceramic flux at temperatures not exceeding about 1150° C.

Multilayer ceramic capacitors are commonly made by casting or otherwise forming insulating layers of dielectric ceramic powder, placing thereupon conducting metal electrode layers, usually in the form of a metallic paste, stacking the resulting elements to form the multilayer capacitor, and firing to densify the material and form a solid solution of the constituent dielectric oxides. Barium titanate is one of the dielectric oxides frequently used in the formation of the insulating ceramic layer. Because of the high Curie temperature of barium titanate, however, other oxides are commonly reacted with the barium titanate to form a solid solution, thereby reducing the Curie temperature of the resulting ceramic material. Because the dielectric constant is highest at the Curie temperature of a material, it is desirable that a material for use as a capacitor has a Curie temperature around room temperature. Certain other oxides, such as manganese dioxide may also be added to improve the insulation resistance and control the dielectric constant of the resulting material by acting as a grain growth controller.

The variation with temperature of the dielectric constant of a ceramic composition for use in a multi-layer capacitor is also of substantial importance. Many dielectric ceramic compositions, including barium titanate, have dielectric constants which vary substantially as the temperature increases or decreases. In a desirable dielectric ceramic composition for a multilayer capacitor used for applications requiring stability in the dielectric constant over a wide temperature range, the dielectric constant does not alter from its base value at 25° C. (room temperature) by more than plus or minus 15 percent. As with the adjustment of the Curie temperature, reaction of the barium titanate with selected oxides is necessary to achieve this flat temperature characteristic.

The materials commonly used to produce such temperature stable capacitors with dielectric constants greater than 2000, are generally fired to maturity in air at temperatures greater than 1150° C. At these temperatures, the metal electrode layer must be formed from the less reactive, higher melting alloys of the so-called precious metals, such as palladium and silver, palladium and gold, and other similarly expensive alloys well known in the art. This is necessary in order to prevent either rotation of the electrode with the insulating ceramic layer or melting which might result in discontinuities in the conducting layer. A method of producing a ceramic composition with a dielectric constant of greater than 2000 with a suitable temperature characteristic, which can be fired at temperatures below 1150° C., would permit the use of a less costly electrode material without sacrificing capacitor performance. The dielectric ceramic compositions previously used to make multilayer capacitors at temperatures below 1150° C. had dielectric constants of less than 2000, and thus were not suitable for most applications.

SUMMARY OF THE INVENTION

It is an object of the present invention to produce a ceramic composition with a dielectric constant which is stable over a wide temperature range. It is another object of this invention to produce a low temperature fired ceramic composition with a dielectric constant of greater than 2400 which varies little with temperature.

The above stated objects and other objects are achieved by the present invention, which is directed to a low temperature fired dielectric ceramic composition formed from two components, i.e. a major component comprising a base ceramic preparation, and a minor component comprising a glass frit or ceramic flux. More specifically, in forming the dielectric ceramic composition of the invention, the major component comprises from about 93.6 to about 96.5 percent by weight of the dielectric ceramic composition while the minor component comprises from about 3.5 to about 6.5 percent by weight of the composition.

The major component of the ceramic composition is a base ceramic preparation of dielectric oxides comprising barium titanate ($BaTiO_3$), niobium pentoxide, and cobalt oxide, or their constituent oxides or oxide precursors. Preferably, TAM Ceramics TICON HPB, Product No. 52901, high purity barium titanate is used in the base ceramic preparation. The compositional ranges of the components of the base ceramic preparation, expressed as the oxides, are barium titanate from about 98.0 to about 99.0 weight percent, niobium pentoxide from about 0.97 to about 1.54 weight percent, the cobalt oxide from about 0.19 to about 0.32 weight percent.

The ceramic flux minor component comprises bismuth titanate, lead titanate ($PbTiO_3$), zinc oxide and boron oxide, or their constituent oxides or oxide precursors. The bismuth titanate referred to herein is $Bi_2Ti_2O_7$ or its constituent oxides or oxide precursors present in amounts to form $Bi_2Ti_2O_7$. The compositional ranges of the components of the glass frit are bismuth titanate from about 16 to about 60 weight percent, lead titanate from about 8 to about 52 weight percent, zinc oxide from about 18 to about 35 weight percent, and boron oxide from about 5 to about 11 weight percent.

In addition, manganese dioxide may be added to the mixture of the base ceramic preparation and the ceramic flux, either as the oxide itself or as a precursor, such as manganese carbonate or a solution containing manganese ions. The compositional range for manganese dioxide is from about 0 to about 0.114 percent of the combined weights of the combined base ceramic preparation and ceramic flux, and preferably about 0.05 percent.

In the preferred embodiment, the base ceramic preparation comprises from about 93.5 to about 96.5 percent and the glass frit comprises from about 3.5 to about 6.5 percent of the total weight of the dielectric composition, with a composition comprising about 95 weight percent base ceramic preparation and about 5 weight percent glass frit being especially preferred.

In the preferred embodiment the weight ratio of bismuth titanate to lead titanate in the ceramic flux is from about 7.33 to one to about 0.33 to one; and the weight ratio of the additive amounts of bismuth titanate and lead titanate to the additive amounts of zinc oxide and boron oxide is from about 3.20 to one to about 1.24 to one. The preferred amount of zinc oxide with respect to base ceramic preparation is from about 1.22 to about 1.6 weight percent, and the preferred amount of boron oxide with respect to base ceramic preparation is from about 0.38 to about 0.50 weight percent.

The preferred ranges for the constituent oxides of the dielectric ceramic composition are barium titanate from about 91.6 to about 95.5 weight percent, boron oxide from about 0.26 to about 0.46 weight percent, cobalt oxide from about 0.18 to about 0.31 weight percent, manganese dioxide from about 0 to about 0.11 weight percent, zinc oxide from about 0.82 to about 1.49 weight percent, bismuth oxide from about 1.04 to about 1.87 weight percent, titanium dioxide from about 0.68 to about 1.23 weight percent, lead oxide from about 0.67 to about 1.20 weight percent and niobium pentoxide from about 0.91 to about 1.49 weight percent.

The preferred ceramic compositions of this invention, formed into multilayer capacitors, have dielectric constants which are typically above 2400, dissipation factors which are typically around 1.4 percent at 1 Vrms and dielectric constants which vary only plus or minus 15 percent with temperature between $-55°$ C. and $125°$C. The capacitors may be formed by firing at temperatures preferably between $1100°$ C. and $1150°$ C.

In an especially preferred embodiment, the ceramic dielectric composition is formed from a mixture of 95.24 weight percent of a base ceramic preparation comprising 98.31 weight percent $BaTiO_3$, 1.40 weight percent $Nb_2O_5$, and 0.29 weight percent $CoO$; 4.76 weight percent of a ceramic flux comprising 27.98 weigh percent $Bi_2Ti_2O_7$, 40.02 weight percent $PbTiO_3$, 24.4 weight percent $ZnO$, and 7.6 weight percent $B_2O_3$; and manganese dioxide in the amount of 0.05 percent based upon the combined weight of the base ceramic preparation and ceramic flux.

DETAILED DESCRIPTION OF THE INVENTION

As set forth below, the dielectric ceramic composition of the present invention has several advantages which result in substantial cost savings without sacrificing desirable physical and electrical properties.

The present invention provides a novel dielectric ceramic composition with improved temperature characteristic which can be prepared by firing the component oxides or precursors thereof at a temperature not exceeding $1150°$ C. This composition differs substantially from those disclosed in the prior art in which desirable physical properties, such as a higher dielectric constant, are sacrificed in order to obtain materials which can be prepared at such lower temperatures. Since the prior art materials had dielectric constants which were too low to be of practical use in multilayer capacitors, it has previously been necessary to use materials which were fired at temperatures above $1150°$ C. At such high temperatures, the use of electrodes containing a high percentage of precious metals such as palladium or platinum is necessary. The lower firing temperature of the ceramic composition of the invention permits the use of silver-palladium electrodes which have a 70 percent silver and only 30 percent palladium content as the conducting layers in multilayer capacitors. This is desirable because palladium, a precious metal, is considerably more expensive than silver. Thus, the use of the ceramic composition of this invention in multilayer capacitors results in considerable cost savings.

A fired ceramic body of the present invention is produced by reacting during the course of firing the constituent dielectric oxides of the base ceramic preparation, including barium oxide, titanium dioxide, cobalt oxide, and niobium pentoxide, with a very small amount of manganese dioxide, and a small amount of glass frit which comprises bismuth trioxide, titanium dioxide, lead oxide, zinc oxide and boron oxide. The oxides of the base ceramic preparation and the ceramic flux may be included as the titanate or other combined forms. For example, barium oxide and titanium dioxide may be reacted to form barium titanate. Similarly, bismuth oxide and titanium dioxide may be reacted to form bismuth titanate, $Bi_2Ti_2O_7$. The combined oxides may also be formed from any reaction which will produce them, e.g., the calcining of an oxide precursor, such as a carbonate or nitrate, with other constituent oxides of their precursors. As is well known in the art, commercial preparations of barium titanate, lead titanate, bismuth titanate and the like come in various grades and the proportions of the constituents of the base ceramic preparation and the ceramic flux may therefor require slight adjustment using known experimental methods in order to achieve the desired properties.

Alternatively, the fired ceramic body of the present invention is produced by reacting during the course of firing a master mix prepared by calcining cobalt oxide, niobium pentoxide, zinc oxide, boric acid, and manganese carbonate, with barium titanate, bismuth titanate and lead titanate.

In the present invention, the proportions and particle sizes of the constituent oxides of the base ceramic preparation, are chosen to maximize the desired physical and electrical properties. Niobium pentoxide, when added to barium titanate, acts to shift the sharp dielectric constant peak which occurs at the Curie temperature of barium titanate ($130°$ C.) down toward room temperature. It is believed that with proper selection of particle distributions for the constituent oxides, a non-homogeneous solid solution of niobium pentoxide will occur along the barium titanate grains and grain boundaries of the fired ceramic, producing a broad range of Curie temperature. This produces the desired flat temperature coefficient of capacitance with a suppressed dielectric constant. The cobalt oxide of the base ceramic preparation serves as a flux, and also as a charge compensator for the pentavalent niobium.

The constituents of the ceramic flux were chosen so as to achieve the same non-homogenous solution of the niobium pentoxide into the barium titanate grains and grain boundaries as in the base ceramic preparation, but at a lowered firing temperature and with slight further suppression of the dielectric constant of the base ceramic.

The zinc oxide and boric acid produces a low viscosity eutectic compound during the firing process. Since zinc borate also suppresses the dielectric constants, the quantity of these two constituents should be kept as low as possible. The bismuth titanate and lead titanate serve as higher viscosity fluxes to increase the viscosity of the zinc borate formed during firing. Bismuth titanate and lead titanate, due to their much higher dielectric constants and Curie temperatures, minimize the suppression of the dielectric constant while serving as fluxing agents. In addition, the ratio of zinc oxide to boric acid and the ratio of bismuth titanate to lead titanate were chosen to help balance the charge compensation and overall stoichiometry of the fired ceramic which is known to be very important in the art.

The manganese oxide constituent, due to its multiple valence levels, it very effective in balancing out the acceptor-donor ions. In this capacity, the manganese oxide improves the insulation resistance of the fired ceramic.

In preparing the base ceramic preparation used in the invention, the constituent oxides in the proportions set forth above may be slurried together in water. After drying, the mixture may be blended with the ceramic flux composition and the manganese dioxide. The ceramic flux composition may comprise a mixture of the component oxides, or the flux component oxides may be melted together, quenched, and pulverized into a single component frit. The combined mixture of the base ceramic preparation, the ceramic flux composition and the manganese dioxide may be cast into a sheet using standard methods, formed into a multilayer capacitor structure with, e.g., 70 percent silver-30 percent palladium electrodes, and fired at about 1110° C. to 1150° C. for about 3 hours.

The low temperature-fire dielectric composition of this invention has an insulation resistance-capacitance product (RC) greater than 10,000 ohm-farads at 25° C. and 50 VDC/mil and greater than 2000 ohm-farads at 125° C. and 50 VDC/mil. The dielectric constant is typically about 2500±200 at 1 KHz and 1 volt rms, and the dissipation factor is typically about 1.8±0.2 percent at 1 KHz and 1 volt rms. Dielectric breakdown voltage ranges from about 650 VDC/mil to about 950 VDC/mil.

Of particular importance is the fact that the dielectric constant of the ceramic composition of the invention varies little and predictably with temperature. In a desirable dielectric ceramic composition for use in multilayer capacitors where temperature stability is of importance, the temperature coefficient of capacitance is such that the dielectric constant does not alter from its base value at 25° C. by increasing or decreasing more than 15 percent in the temperature range between minus 55° C. and 125° C. This value also represents a specification in the ceramic industry known as the X7R temperature characteristic. In the dielectric ceramic composition of the present invention, the temperature coefficient of capacitance meets this standard.

The invention will be further illustrated by the following examples, but the invention is not intended to be limited thereto. The values given for the examples herein are subject to variations based on factors known in the art. For example, with respect to Examples 1–31 herein, the dielectric constant may be significantly increased and the dissipation factor may be significantly decreased by pulverizing, milling, uniformly dispersing, or otherwise reducing the starting material to very fine particles. Such practices, which are commonly carried out in the course of manufacturing ceramic capacitors, were not employed to their full extent in the preparation of Examples 1–31. In addition, variations in firing conditions, sample thickness and preparation, and measurement error may result in differences in the observed values for the same composition. Thus, depending upon manufacturing techniques, and without regard to particle size, the properties of ceramic composition made using the proportions given in Examples 1–31, can vary from values given; for example the dielectric constants may vary by ±200, the dissipation factor may vary by ±0.2 percent, and the capacitance change with temperature versus capacitance at 25° C. may vary by ±1.5 percent.

EXAMPLES 1-7

Effect of Variation of Ratio of Ceramic Flux to Base Ceramic Preparation

A base ceramic preparation was prepared by slurrying in water 49.15 grams of TAM Ceramics TICON HPB high purity barium titanate, 0.70 grams of technical grade fine particle size niobium pentoxide, and 0.15 grams of technical grade fine particle size cobalt oxide. Fifty grams of the base ceramic preparation was mixed with zero to five grams of ceramic flux comprising 41.2 weight percent of bismuth titanate ($Bi_2Ti_2O_7$), 26.8 weight percent of lead titanate ($PbTiO_3$), 24.4 weight percent zinc oxide (ZnO), and 7.6 weight percent boron oxide $B_2O_3$ was added in the form of boric acid ($H_3BO_3$). The ratio of flux to base preparation for each Examples 1–7 is shown in Table 1. For each sample, manganese carbonate was added to the resulting mixed powder of the base ceramic preparation and the ceramic flux in an amount constituting 0.057 weight percent of the total powder. The ceramic powder mixture was added to 25 milliliters of distilled water and mixed thoroughly in a high speed Spex paint mixer for 10 minutes. The resultant slurry was then dried into a cake and ground in a mortar and pestle. Four milliliters of a binder solution including 26 weight percent water, 26 weight percent propylene glycol, and 48 weight percent corn syrup was mixed into the ceramic powder in a mortar and pestle and then granulated through a 40 mesh nylon screen. Discs of the resultant mixture having a diameter of 1.27 centimeters and a thickness of 0.1 to 0.15 centimeters were pressed at a pressure of 38,000 lbs. per square inch in a stainless steel die. The discs were placed on a stabilized zirconia setter and fired at temperatures from 1110° C. to 1150° C. for 3 hours.

After cooling, the thickness and diameter of the sintered ceramic discs were measured with a micrometer and a vernier caliper. Silver electrodes were painted on the major surfaces and then fired at 850° C. to sinter on the electrodes. The capacitance, dissipation factor (DF), and capacitance change with temperature versus capacitance at 25° C. (TC) were then measured with an Electro Scientific Industries, Inc. model 2110A bridge at 1 KHz 1 Vrms. At least three discs from each example were measured. The measurement and temperature variation/programming were all controlled by computer and microprocessor, and the measurement steps were carried out according to accepted industrial practice.

The dielectric constant (K), of each disc was calculated according to the formula:

$$K = 5.66 \times C_{25} \times \frac{l}{D^2} \times 10_{12}$$

where $C_{25}$ is the capacitance value at 25° C.; l is the thickness of the disc in inches; and D is the diameter of the disc in inches.

The results are shown in Table 1, from which it can be seen that when the flux/base ceramic preparation weight ratio is less than 0.035, such as in Examples 1 and 2, the dielectric ceramic composition will not be sintered to sufficient density and TC at minus 55° C. is greater than 18%. When the flux/base ceramic preparation weight ratio is greater than 0.065, such as in Examples 6 and 7, the dielectric constant was reduced to below 2100. These compositions would be of little practical use even though they demonstrated improved dissipation and flatter TC characteristics.

TABLE 1

Effect of Variation of Ratio of Ceramic Flux to Base Ceramic Preparation

| Ex. | Flux/Base Ceramic Wt. Ratio | K | DF | Capacitance Change With Temperature v. Capacitance at 25° C. (TC) | | | |
|---|---|---|---|---|---|---|---|
| | | | | TC −55° C. | TC −30° C. | TC 85° C. | TC 125° C. |
| 1 | 0 | | Will not sinter | | | | |
| 2 | .02 | 2230 | 1.45% | −19.8% | −15.3% | −9.4% | −6.1% |
| 3 | .035 | 2380 | 1.23 | −17.2 | −13.2 | −3.4 | 3.8 |
| 4 | .05 | 2360 | 1.15 | −15.3 | −11.5 | −1.1 | 8.8 |
| 5 | .065 | 2160 | 1.08 | −12.5 | −8.6 | 0.4 | 10.1 |
| 6 | .08 | 2090 | 1.06 | −11.8 | −8.2 | 1.3 | 12.0 |
| 7 | .10 | 2055 | 1.07 | −13.2 | −9.4 | 2.2 | 13.2 |

EXAMPLES 8-11

Variation of Amount of Manganese

Fifty grams of base ceramic preparation powder as described in Examples 1-7 was mixed with 2.65 grams of ceramic flux as described in Examples 1-7. Manganese carbonate was added to the resulting mixed powder in varying weight percentages as set forth for Examples 8-11 in Table 2. Ceramic discs were prepared and sintered in the same manner as described in Examples 1-7. The dielectric properties were measured and are set forth in Table 2. The addition of manganese carbonate improved the dissipation factor and the TC of the ceramic dielectric composition. However, when more than 0.190 weight percent manganese carbonate was added, such as in Example 11, the dielectric constant was reduced to less than 2100, resulting in a material impractical for use in a multilayer capacitor as described herein.

TABLE 2

Effect of Variation of Amount of Manganese

| Ex. | Wt. % MnCO$_3$ | K | DF | Capacitance Change With Temperature v. Capacitance at 25° C. (TC) | | | |
|---|---|---|---|---|---|---|---|
| | | | | TC −55° C. | TC −30° C. | TC 85° C. | TC 125° C. |
| 8 | 0% | 2240 | 1.14% | −15.7% | −12.2% | −1.4% | 7.7% |
| 4 | 0.057% | 2250 | 1.06 | −17.3 | −13.5 | −3.3 | 5.6 |
| 9 | 0.114% | 2190 | 0.94 | −14.9 | −11.7 | −0.9 | 8.2 |
| 10 | 0.190% | 2115 | 0.82 | −14.1 | −11.7 | −1.0 | 8.4 |
| 11 | 0.285% | 2070 | 0.62 | −13.0 | −11.0 | −0.7 | 9.4 |

EXAMPLES 12-17

Variation of Ratio of Bismuth Titanate to Lead Titanate

Fifty grams of base ceramic preparation powder as described in Examples 1-7 was mixed with 2.65 grams of a ceramic flux. In each example the ceramic flux contained 68 weight percent of bismuth titanate and lead titanate combined, 24.4 weight percent of zinc oxide and 7.6 weight percent of boron oxide. The weigh ratio of bismuth titanate to lead titanate was varied as set forth in Table 3. Manganese carbonate was added to the total base ceramic preparation/ceramic flux powder in an amount of 0.057 weight percent. Ceramic discs were prepared and sintered, and the dielectric properties measured, as set forth in Examples 1-7. The results are summarized in Table 3. From these examples it can be seen that when the bismuth titanate/lead titanate weight ratio increased, the dielectric constant of the dielectric ceramic composition decreased, going to 2000 when, as in Example 12, no lead titanate was included. When the bismuth titanate/lead titanate ratio went to zero, such as in Example 17, the value for TC at −55° C. exceeded −15 percent, even though the dielectric constant was high and the dissipation factor was low. The compositions of Examples 16 and 17, where the bismuth titanate/lead titanate weight ratio was lower than 0.333 are less desirable than, for example, the composition of Example 4, included here for comparison purposes, because lead titanate has acceptor effects which introduce a second peak in the TC characteristics beginning at about 45° C. and which also cause TC at 125° C. to become much more negative than ceramic compositions with a bismuth titanate/lead titanate weight ratio greater than 0.333.

Although it is not apparent from examination of Table 3, and the capacitance variation in Example 16 is still with ±15% from −55° C. to 125° C., the composition of Example 16, when applied in a multilayer capacitor design, has a high potential to develop a second peak at about 45° C. which exceeds +20% due to additional acceptor contamination which is very common in multilayer capacitor processes.

TABLE 3

| | Variation in Ratio of Bismuth Titanate to Lead Titanate | | | | | | |
|---|---|---|---|---|---|---|---|
| Ex. | Wt. ratio of Bi$_2$Ti$_2$O$_7$ to PbTiO$_3$ | K | DF | Capacitance Change With Temperature v. Capacitance at 25° C. (TC) | | | |
| | | | | TC −55° C. | TC −30° C. | TC 85° C. | TC 125° C. |
| 12 | —* | 2000 | 1.11 | −14.5 | −10.1 | 2.6 | 13.6 |
| 13 | 7.330 | 2135 | 1.36 | −15.3 | −10.7 | 1.3 | 11.5 |
| 14 | 3.050 | 2220 | 1.09 | −16.4 | −12.2 | 0.7 | 11.3 |
| 4 | 1.540 | 2250 | 1.06 | −17.3 | −13.5 | −3.3 | 5.6 |
| 15 | 0.700 | 2300 | 1.05 | −15.5 | −12.0 | −1.8 | 7.6 |
| 16 | 0.333 | 2380 | 0.99 | −14.6 | −11.1 | −2.8 | 5.6 |

TABLE 3-continued

| | Variation in Ratio of Bismuth Titanate to Lead Titanate | | | | | | |
|---|---|---|---|---|---|---|---|
| | Wt. ratio of $Bi_2Ti_2O_7$ to | | | Capacitance Change With Temperature v. Capacitance at 25° C. (TC) | | | |
| Ex. | $PbTiO_3$ | K | DF | TC −55° C. | TC −30° C. | TC 85° C. | TC 125° C. |
| 17 | 0.000 | 2450 | 0.87 | −17.8 | −13.9 | −5.9 | −1.2 |

*No lead titanate was included in the composition of Example 12.

was low, the dissipation factor was high and the TC was large for this example. When the same ratio was less than 1.24, such as in Examples 22–25, the ceramic composition became semiconducting and the TC characteristics became exceedingly large. Examples 24 and 25 most clearly demonstrate the necessity for adding the bismuth titanate and lead titanate components in order to achieve the flat temperature characteristic of the invention.

TABLE 4

| | Variation of Ratio of Bismuth Titanate Plus Lead Titanate to Zinc Oxide plus Boron Oxide | | | | | | |
|---|---|---|---|---|---|---|---|
| | Wt. ratio $(Bi_2Ti_2O_7 + PbTiO_3)$ to | | | Capacitance Change With Temperature v. Capacitance at 25° C. (TC) | | | |
| Ex. | $(ZnO + B_2O_3)$ | K | DF | TC −55° C. | TC −30° C. | TC 85° C. | TC 125° C. |
| 18 | 4.88 | 2270 | 1.36 | −17.4 | −13.3 | −0.7 | 11.4 |
| 19 | 3.20 | 2300 | 1.33 | −18.3 | −14.3 | −0.9 | 8.8 |
| 4 | 2.13 | 2360 | 1.15 | −15.3 | −11.5 | −1.1 | 8.8 |
| 20 | 1.37 | 2220 | 1.05 | −13.0 | −9.5 | −3.0 | 5.0 |
| 21 | 1.24 | 2270 | 1.09 | −15.5 | −11.5 | −4.6 | 1.3 |
| 22 | 1.08 | 2390 | 1.32 | −18.0 | −15.2 | −2.6 | −4.1 |
| 23 | 0.57 | 1890 | 1.38 | −0.7 | −3.3 | 71.7 | −6.7 |
| 24 | 0.00 | 2320 | 0.92 | −54.1 | −39.7 | 14.8 | −37.6 |
| 25 | 0.00* | 2800 | 0.88 | −34.9 | −25.3 | −5.4 | −28.2 |

*2% total

EXAMPLES 18–25

Variation of Ratio of Bismuth Titanate plus Lead Titanate to Zinc Oxide plus Boron Oxide In each of Examples 18–25, 50 grams of base ceramic preparation as described in Examples 1–7, was mixed with 2.65 grams of a ceramic flux and the resultant mixed powder was mixed with 0.057 percent by weight of manganese carbonate. The ceramic flux composition of these examples was varied with respect to the amount of bismuth titanate and lead titanate combined versus the amount of zinc oxide and boron oxide combined. A mixture of 60.4 grams of bismuth titanate and 39.6 grams of lead titanate was prepared, as was a mixture of 78.2 grams of zinc oxide and 21.8 grams of boron oxide. The weight ratio of the bismuth titanate/lead titanate mixture to the zinc oxide/boron oxide mixture was varied as set forth in Table 4. Ceramic discs were prepared and sintered, and the dielectric properties measured as described in Examples 1–7. The results for each example are set forth in Table 4. As can be seen from the results, when the weight ratio of the bismuth titanate/lead titanate component to the zinc oxide/boron oxide component was greater than 3.2, such as in Example 18, the ceramic dielectric composition cannot be sintered to be sufficiently dense. Therefore, the dielectric constant

EXAMPLES 26–31

Variation of Amount of Zinc Oxide and Boron Oxide

In each of Examples 26–31, 50 grams of base ceramic preparation powder as described in Examples 1–7 was mixed with 1.03 grams of bismuth titanate, 0.67 grams of lead titanate, and with the ratio of the weights of zinc oxide and boron oxide to total powder weight varied as set forth in Table 5. Manganese carbonate was added to the total mixture of each example in the amount of 0.057 percent by weight. Ceramic discs were prepared and sintered, and the dielectric properties were measured as described in Examples 1–7. The results are set forth in Table 5. As can be seen from Table 5, when the boron oxide to total powder ratio is greater than 0.005 such as in Example 27, the dielectric constant was reduced to below 2100, and was too low to be of practical use. When the zinc oxide to total powder ratio is greater than 0.016 such as in Examples 30 and 31, the resulting sample became semiconducting and widely varying TC characteristics were present. As can be seen from Example 31, a composition containing a zinc oxide to total powder ratio of 0.020 showed a second peak far above 15% in the TC, and thus compositions with elevated amounts of zinc oxide are unsuitable for use in multi-layer capacitors according to this invention.

TABLE 5

| | Variation of Amount of Zinc Oxide and Boron Oxide | | | | | | | |
|---|---|---|---|---|---|---|---|---|
| | wt. ratio of ZnO to total powder | wt. ratio of $B_2O_3$ to total powder | | | Capacitance Change With Temperature v. Capacitance at 25° C. (TC) | | | |
| Ex. | | | K | DF | TC −55° C. | TC −30° C. | TC 85° C. | TC 125° C. |
| 4 | .0122 | .0038 | 2250 | 1.06 | −15.3 | −11.5 | −1.1 | 8.8 |
| 26 | .0122 | .0048 | 2210 | 0.99 | −12.3 | −8.8 | −0.8 | 9.0 |
| 27 | .0122 | .0076 | 2000 | 0.91 | −9.7 | −6.9 | −0.3 | 9.5 |
| 28 | .0140 | .0038 | 2450 | 1.18 | −13.9 | −9.8 | −0.7 | 8.9 |
| 29 | .0160 | .0038 | 2450 | 1.21 | −15.2 | −11.2 | −1.9 | 6.8 |
| 30 | .0180 | .0038 | 2500 | 1.52 | −19.8 | −16.7 | 1.2 | −0.8 |
| 31 | .0200 | .0038 | 1930 | 1.76 | −14.1 | −15.6 | 73.8 | 13.7 |

EXAMPLE 32

A ceramic powder slurry was prepared by mixing and dispersing uniformly 474.6 grams of the base ceramic preparation powder described in Examples 1–7, 6.6 grams bismuth titanate, 9.5 grams lead titanate, 5.8 grams zinc oxide, 3.2 grams boric acid, and 0.3 grams manganese carbonate with 5 grams of Nuodex V1444 surfactant, 20 grams of toluene, 5 grams of ethanol, and 250 grams of binder solution made by uniformly mixing and dissolving 27.5 grams of Butvar B-76 vinyl resin, 5 grams of Nuodex V1444, 13.8 grams of dioctyl phthalate, 163 grams of toluene and 445.8 grams of ethanol. The resultant slurry was milled for 16 hours and discharged and filtered through 44 micron screen. 360 grams of the resulting slip, having a viscosity of 4960 centipoise, was further mixed with 4.8 grams of toluene and 1.2 grams of ethanol to adjust its viscosity to 3360 centipose. The slip was then vacuum de-aired and cast into a strip or tape having a thickness of 2.4 mil by procedures commonly known in the art. The tape was converted into multilayer ceramic capacitors with 70 percent silver-30 percent palladium electrodes via conventional processes well known in the industry. The capacitors were preheated to 260° C. for 48 hours, placed on stabilized zirconia or high density alumina setter and sintered at 1110° C. to 1140° C. for 3 hours. The sintered capacitors had 10 active dielectric layers with dielectric thickness of 1.75 mil. Electrodes of Dupont silver paint No. 4822 were applied at opposite ends of the multilayer capacitor to connect alternate layers, and the capacitor was fired at 815° C. in a tunnel furnace. The dielectric properties of the resulting capacitors were dielectric constant: 2600±200 at 1 KHz and 1 volt rms; dissipation factor: 1.4±0.2 percent at 1 KHz and 1 volt rms; TC: $-12.0\pm1.5$ percent at $-55°$ C., $-9.0\pm1.5$ percent at $-30°$ C., $-4.0\pm1.5$ percent at 85° C., and $-0.5\pm1.5$ percent at 125° C.; RC: greater than 3000 ohm-farads at 25° C. and 50 VDC per mil and greater than 1650 ohm-farads at 125° C. and 50 VDC/mil for capacitors fired at 1110° C., and greater than 10,000 ohm-farads at 25° C., 50 VDC/mil and greater than 2000 ohm-farads at 125° C., 50 VDC/mil for capacitors fired between 1120° C. and 1140° C. The dielectric breakdown voltage of the multilayer capacitors prepared according to this example was greater than 680 VDC/mil.

EXAMPLE 33

A ceramic master mix was prepared by dry mixing and blending a 3.73 kilograms grams cobalt oxide, 17.27 kilograms niobium pentoxide, 15.16 kilograms zinc oxide, 8.45 kilograms boric acid, and 0.747 kilograms manganese carbonate in a large scale cone blender for 2 hours. The powder mixture was then calcined at 815° to 825° C. for 3 hours in a tunnel kiln. The calcined material was then pulverized and placed in a vibratory energy mill with alumina media in deionized water at about a 55 weight percent powder content. The slurry was milled for 10½ hours, discharged, dried and pulverized to 1.4 micron particle size and 4.97 $M^2$/gram surface area. A ceramic dielectric composition was prepared by dry mixing and blending 424.7 kilograms TAM Ceramics TICON HPB high purity barium titanate, 6.05 kilograms bismuth titanate, 8.636 kilograms lead titanate, and 14.22 kilograms master mix, as described above in a large scale cone blender for 2 hours. The resulting powder mixture had an average particle size of 1.3 microns and a surface area of 2.59 $M^2$/gram. 400 grams of the resulting dielectric composition was charged into a pebble mill with ⅛ inch alumina media together with 218 grams of a binder solution made by uniformly mixing and dissolving 24 grams Butvar B-76 vinyl resin, 40.4 grams Nuodex V1444, 12 grams of dioctyl phthalate, 142 grams of toluene and 35.5 grams of ethanol. The slurry was milled for 16 hours and discharged and filtered through a 44 micron screen. The slip, with a viscosity of 1880 centipoise, was then deaired and cast in accordance with standard techniques into a tape with a thickness of 1.5 mils. The tape was converted into a multilayer ceramic capacitors with 70 percent silver-30 percent palladium electrodes in accordance with techniques standard in the industry, sintered and provided with silver electrodes as described in Example 31. The sintered ceramic capacitor of this example had 10 active dielectric layers with a dielectric thickness of 1.0 mils. The dielectric properties of the capacitor of this example were dielectric constant: 2600±200 at 1 KHz, 1 vrms; dissipation factor: 1.8±0.2 percent at KHz, 1 vrms. The temperature characteristic, TC, was $-8.0\pm1.5$ percent at $-55°$ C., $-5.5\pm1.5$ percent at $-30°$ C., $-2.0\pm1.5$ percent at 85° C., and 3.0±1.5 percent at 125° C. The insulation resistance-capacitance product, RC, was greater than 10,000 ohm-farads at 25° C., 50 VDC/mil and greater than 2,000 ohm-farads at 125° C., 50 VDC/mil. The capacitance change with a 50 VDC bias at 1 KHz, 1 vrms was $-19.0\pm2.0$ percent at 25° C., $-24.0\pm2.0$ percent at $-55°$ C. and $-24.0\pm2.4$ percent at 125° C. The dielectric breakdown voltage for the multilayer capacitor of this example was greater than 900 VDC per mil.

What is claimed is:

1. A dielectric ceramic composition consisting essentially of from about 91.6 to about 95.5 weight percent barium titanate, from about 0.91 to about 1.49 weight percent niobium pentoxide, from about 0.18 to about 0.31 weight percent cobalt oxide, from about 1.04 to about 1.87 weight percent bismuth trioxide, from about 0.68 to about 1.23 weight percent titanium dioxide, from about 0.67 to about 1.20 weight percent lead oxide, from about 0.26 to about 0.46 weight percent boron oxide, from about 0.82 to about 1.49 weight percent zinc oxide, and from 0 to about 0.11 weight percent manganese dioxide.

2. A dielectric ceramic composition formed by firing a mixture comprising (a) from about 93.5 to about 96.5 percent by weight of a base ceramic preparation consisting essentially of metal oxides or precursors thereof in proportions to provide, in the oxide form, from about 98.0 to about 99 weight percent barium titanate, from about 0.97 to about 1.54 weight percent niobium pentoxide, and from about 0.19 to about 0.32 weight percent cobalt oxide; (b) from about 3.5 to about 6.5 percent by weight of a ceramic flux consisting essentially of metal oxides or precursors thereof in proportions to provide, in the oxide form, about 16 to about 60 weight percent bismuth titanate ($Bi_2Ti_2O_7$), about 8 to about 52 weight percent lead titanate, about 18 to about 35 weight percent zinc oxide, and about 5 to about 11 weight percent boron oxide; and (c) manganese dioxide or precursors thereof in proportions to provide manganese dioxide in an amount of from about 0 to 0.114 percent of the combined weight of said base ceramic preparation and said ceramic flux.

3. A dielectric ceramic composition in accordance with claim 2 wherein said mixture comprises about 95 weight percent of said base ceramic preparation and about 5 weight percent of said ceramic flux.

4. A dielectric ceramic composition in accordance with claim 2 wherein the ratio of the weight of said bismuth titanate to the weight of said lead titanate is between about 7.33:1 and about 0.33:1.

5. A dielectric ceramic composition in accordance with claim 2 wherein the ratio of the combined weight of said bismuth titanate and said lead titanate to the combined weight of said zinc oxide and said boron oxide is between 3.20:1 and 1.24:1.

6. A dielectric ceramic composition in accordance with claim 2 wherein said zinc oxide is from about 1.22 to about 1.60 percent of the combined weight of said base ceramic preparation and said ceramic flux.

7. A dielectric ceramic composition in accordance with claim 2 wherein said boron oxide is from about 0.38 to about 0.50 percent of the combined weight of said base ceramic preparation and said ceramic flux.

8. A dielectric ceramic composition in accordance with claim 2 wherein the dielectric constant is greater than 2400.

9. A dielectric ceramic composition in accordance with claim 2 wherein said composition is formed by sintering said base ceramic preparation, said ceramic flux and said manganese dioxide or oxide precursors thereof at a temperature between about 1100° C. and 1140° C.

10. A dielectric ceramic composition in accordance with claim 2 wherein the capacitance of said composition varies with temperature from the capacitance at 25° C. about 15 percent or less at temperatures between about −55° C. and about 125° C.

11. A dielectric ceramic composition having a dielectric constant greater than 2400, said composition consisting essentially of from about 91.6 to about 95.5 weight percent barium titanate, from about 0.91 to about 1.49 weight percent niobium pentoxide, from about 0.18 to about 0.31 weight percent cobalt oxide, from about 1.04 to about 1.87 weight percent bismuth trioxide, from about 0.68 to about 1.23 weight percent titanium dioxide, from about 0.67 to about 1.20 weight percent lead oxide, from about 0.26 to about 0.46 weight percent boron oxide, from about 0.82 to about 1.49 weight percent zinc oxide, and from 0 to about 0.11 weight percent manganese dioxide, wherein the capacitance of said composition varies with temperature about 15 percent or less from the capacitance at 25° C. at temperatures between about −55° C. and about 125° C.

12. A dielectric ceramic composition formed from (a) about 95.24 percent by weight of a base ceramic preparation consisting essentially of metal oxides or precursors thereof in proportions to provide, in the oxide form, about 98.31 weight percent barium titanate, about 1.40 weight percent niobium pentoxide, and 0.29 weight percent cobalt oxide; (b) about 4.76 percent by weight of a ceramic flux consisting essentially of metal oxides or precursors thereof in proportions to provide, in the oxide form, about 27.99 weight percent bismuth titanate $(Bi_2Ti_2O_7)$, about 40.02 weight percent lead titanate, about 24.4 weight percent zinc oxide and 7.6 weight percent boron oxide; and (c) manganese dioxide or precursors thereof in proportions to provide manganese dioxide in an amount of about 0.05 percent of the combined of the combined weight of said base ceramic preparation and said ceramic flux.

13. A method of making dielectric ceramic composition which comprises:
(1) mixing
  (a) a base ceramic preparation consisting essentially of metal oxides or precursors thereof in proportions to provide, in the oxide form, from about 98.0 to about 99 weight percent barium titanate, from about 0.97 to about 1.54 weight percent niobium pentoxide, and from about 0.19 to about 0.32 weight percent cobalt oxide;
  (b) a ceramic flux consisting essentially of metal oxides or precursors thereof in proportions to provide, in the oxide form, from about 16 to about 60 weight percent bismuth titanate $(Bi_2Ti_2O_7)$, about 8 to about 52 weight percent lead titanate, about 18 to about 35 weight percent zinc oxide, and about 5 to about 11 weight percent boron oxide; and
  (c) manganese dioxide or precursors thereof in proportions to provide manganese dioxide in an amount of from about 0 to about 0.114 percent of the combined weight of said base ceramic preparation and said ceramic flux;
(2) firing the resulting mixture at a temperature between about 1100° C. and about 1140° C.

14. A method in accordance with claim 13 wherein said mixture of said base ceramic preparation and said ceramic flux consists essentially of from about 3.5 to about 6.5 weight percent of said ceramic flux and of from about 96.5 to about 93.5 weight percent of said base ceramic preparation.

15. A method in accordance with claim 13 wherein said mixture of said base ceramic preparation and said ceramic flux consists essentially of about 95 weight percent of said base ceramic preparation and 5 weight percent of said ceramic flux.

* * * * *